United States Patent [19]
Brett

[11] Patent Number: 5,505,415
[45] Date of Patent: Apr. 9, 1996

[54] TRIPOD

[76] Inventor: Kenneth S. Brett, Ambleside, Darrs Lane, Northchurch, Hertfordshire, United Kingdom, HP4 3TT

[21] Appl. No.: 196,133
[22] PCT Filed: Aug. 19, 1991
[86] PCT No.: PCT/GB91/01404
  § 371 Date: Jun. 23, 1994
  § 102(e) Date: Jun. 23, 1994
[87] PCT Pub. No.: WO93/04314
  PCT Pub. Date: Mar. 4, 1994
[51] Int. Cl.⁶ ............................................. F16M 11/38
[52] U.S. Cl. .................. 248/168; 248/181.1; 248/288.51
[58] Field of Search ........................... 248/168, 169, 248/181, 435, 170, 171, 288.5, 481, 288.3, 177

[56] References Cited

U.S. PATENT DOCUMENTS

| | | | |
|---|---|---|---|
| 911,544 | 2/1909 | Roehlk | 248/168 |
| 1,715,668 | 6/1929 | Mooney | 248/169 UX |
| 2,195,391 | 3/1940 | Hunter | 248/170 X |
| 2,282,285 | 5/1942 | Olson | 248/169 |
| 3,114,529 | 12/1963 | Mills | 248/168 |
| 4,974,802 | 12/1990 | Hendren | 248/288.5 X |
| 5,249,766 | 10/1993 | Vogt | 248/181 |

FOREIGN PATENT DOCUMENTS

| 1623489 | 1/1973 | Germany | 248/168 |
|---|---|---|---|

*Primary Examiner*—J. Franklin Foss
*Attorney, Agent, or Firm*—Fay, Sharpe, Beall, Fagan, Minnich & McKee

[57] ABSTRACT

A tripod of the kind in which the head comprises an arcuate bolt on which the legs are pivoted, the pivots being spaced apart by wedges carried on the bolt. A pillar guide for an article supporting sliding pillar (14), and constructed from symmetrical half-shells, is also pivoted on the head and the pillar has rings for carrying straps (114) at each end. The leg pivots are offset from the axes of the three respective legs so as to facilitate folding the tripod into as compact an assembly as possible which is easy to carry as the center of gravity of the folded assembly can be adjusted by moving the pillar (14) in the pillar guide (18).

5 Claims, 8 Drawing Sheets

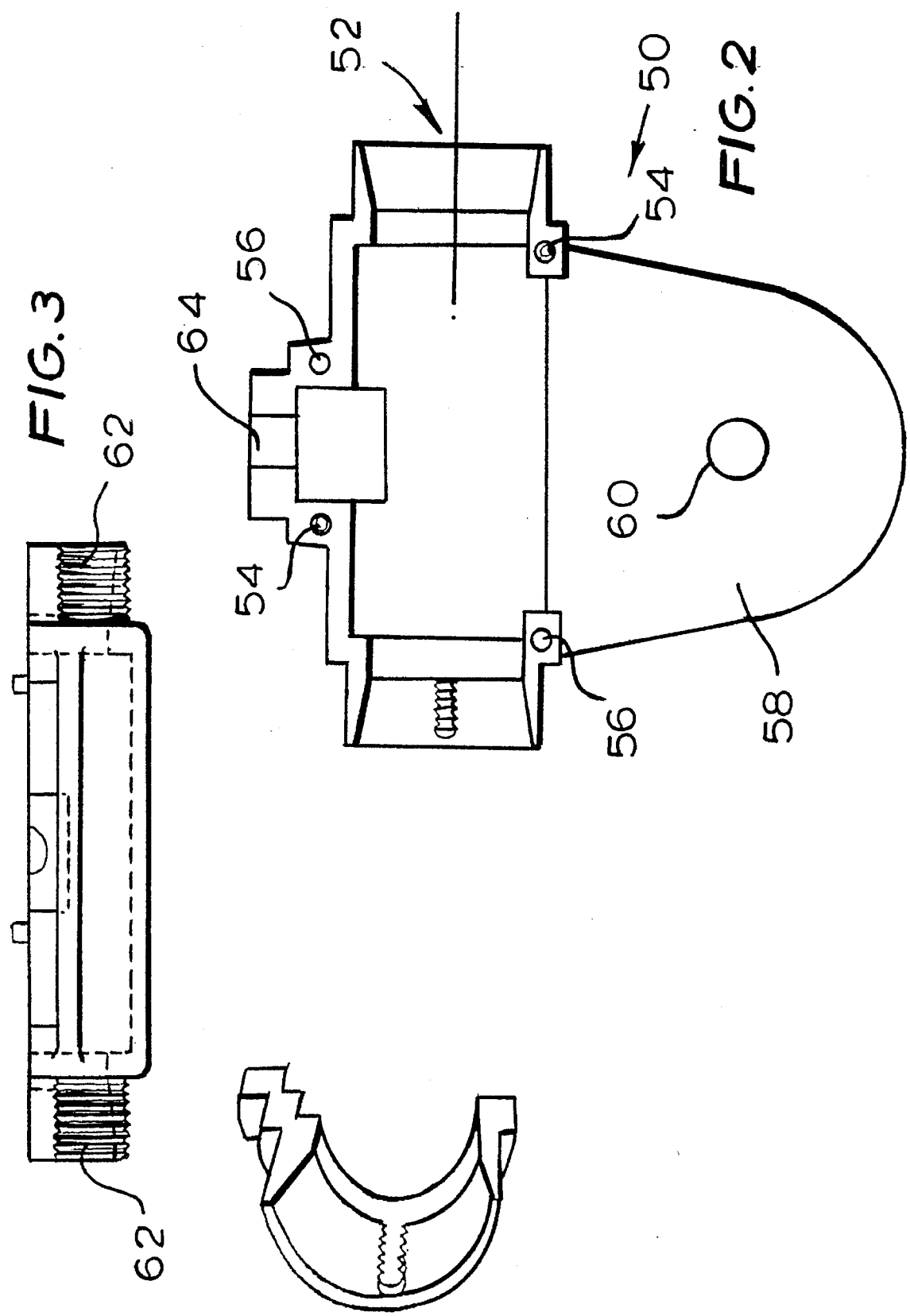

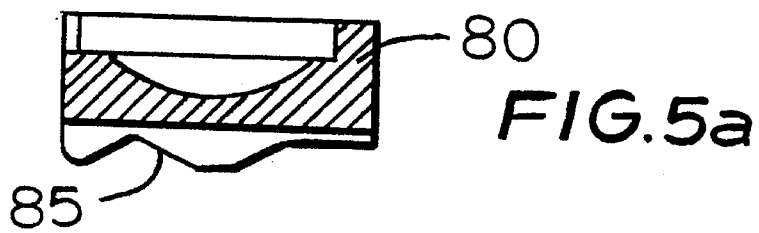
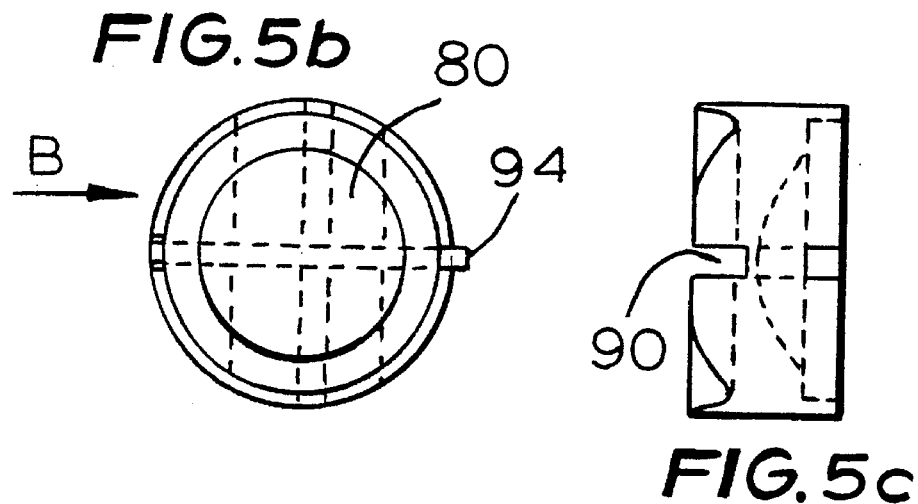
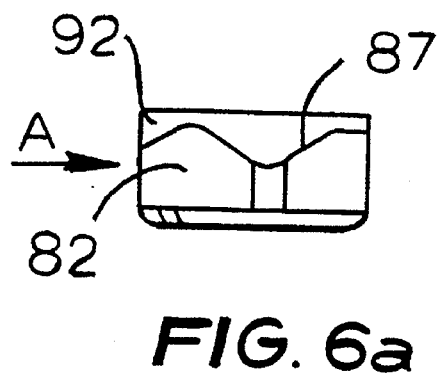
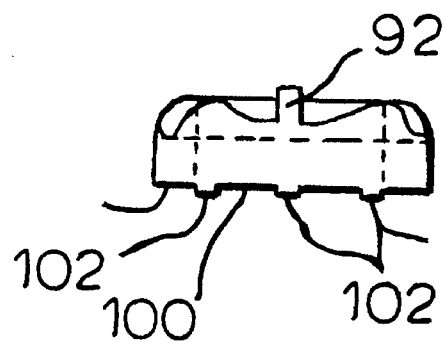
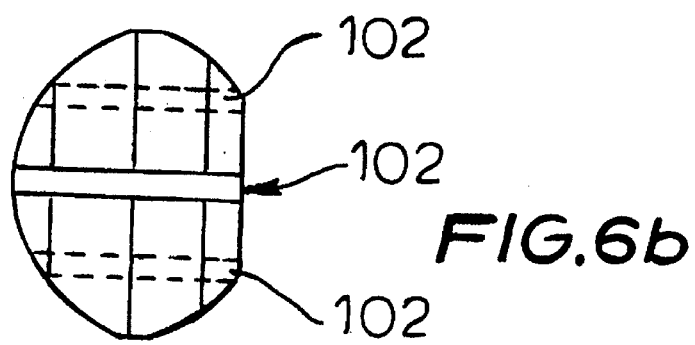

TRIPOD

This invention relates to tripods, and particularly though not exclusively, to a tripod of the kind having a mounting head with an arcuate bolt carrying an article supporting bracket or mounting and a plurality of wedge-shaped spacers between the pivots at the top ends of the tripod legs. A tripod of this kind is shown in British Patent No. 916607, and is referred to generally herein below as "a tripod of the type described".

Tripods of this type have a number of significant advantages compared with tripods of the conventional kind having an ordinary platform to which the legs are pivotally connected. Notably, they are considerably more rigid in use and are also much more robust generally because of the "single bolt" head construction.

However, conventional tripods of this kind still suffer from a number of other drawbacks, such as a tendency to be somewhat bulky when folded.

Also, because of the necessity to construct the tripod with considerable rigidity, it is generally quite heavy even in relatively small versions, and consequently awkward to carry about.

The present invention seeks to improve on these and other aspects of the construction of a tripod of the type described.

According to the present invention there is provided a tripod having a head with a slidable, article supporting pillar mounted on the head, the pillar having carrying strap attachment-means at each end, whereby the relative positions of the pillar and the body of the tripod can be adjusted to shift the centre of gravity and thus balance the assembly for carrying purposes.

Preferably, the connectors comprise "D-ring" members, each of which is formed as part of a corresponding "camera platform" at the end of the pillar.

According to a further aspect of the present invention, there is provided a tripod of the type described and having telescopic legs with fixing clamps, in which the pivot point of the upper ends of each leg is offset, relative to the axis of the leg, whereby the three legs of the tripod can be brought into parallel alignment, even in the completely "telescoped" condition, and even when the leg clamps are adjacent to each other.

According to another aspect of the invention, there is provided a tripod of the type described having a head incorporating a tubular pillar guide for a slidable pillar, the guide having a a pivotable bracket for attachment to the arcuate bolt, the pillar guide being formed from two symmetrical "half shells", and terminating in a tubular extension at each end, which is threaded on its outside surface, so as to receive a threaded collar, whereby the two end collars hold the half shells in the assembled condition.

According to a further feature of the invention, there is provided a ball and socket head for a tripod, comprising a ball carrying a camera mounting platform, and a retaining housing for the ball, having an aperture through which the camera platform projects, and a seat for the ball which is supported by means of a wedging device which is slidable laterally, relative to the axis of the head, and cooperates with a complementary sloping surface on the underside of the ball seat, means being provided for moving the wedging device, and consequently the seat, by a small distance in the said lateral direction, so as to grip or release the ball.

Preferably, the wedging device incorporates two diametrically offset parallel sloping formations on its surface, and the ball seat is provided with complementary formations.

Some embodiment of the invention will now be described with reference to the accompanying drawings, in which:

FIG. 2 is a plan view of a "half shell" of a pillar guide;

FIG. 3 is an end view of the pillar guide of FIG. 2;

FIG. 5 is an exploded view of a part of the assembly of FIG. 4;

FIG. 6a is side view of a camming device used in the ball and socket head of FIG. 4;

FIG. 6b is a plan view of the camming device of FIG. 6a;

FIG. 6c is a side elevation on the arrow (A) of FIG. 6a;

FIG. 6d is a perspective view from above and one side of the camming device of FIG. 6a;

FIG. 7b is a plan view of the platform of FIG. 7a.

Figure 1A:
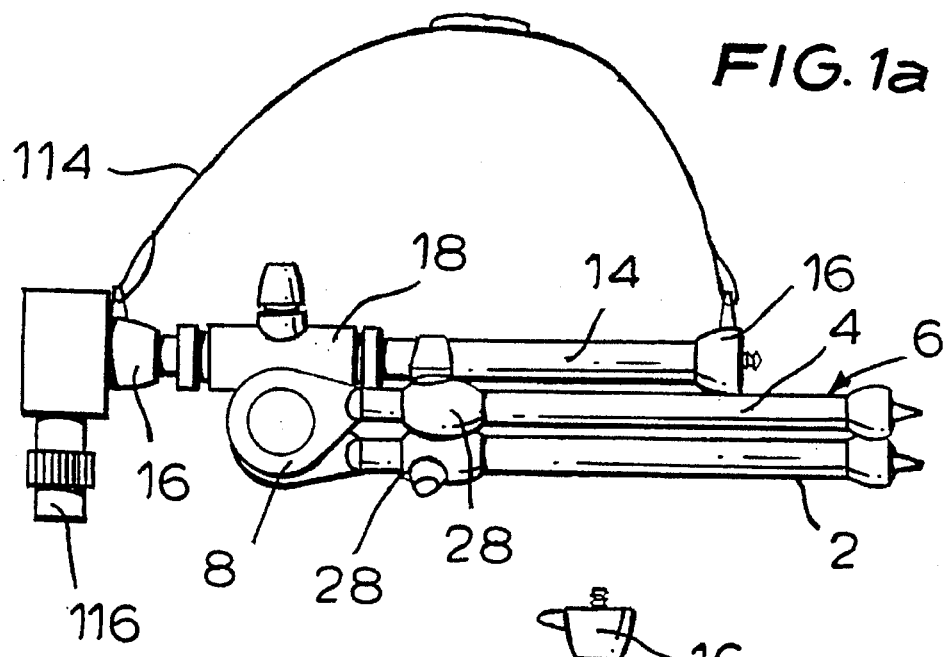
FIG. 1a is an "side-elevation" of a tripod, in accordance with the invention, in the folded condition.
Figure 1B:
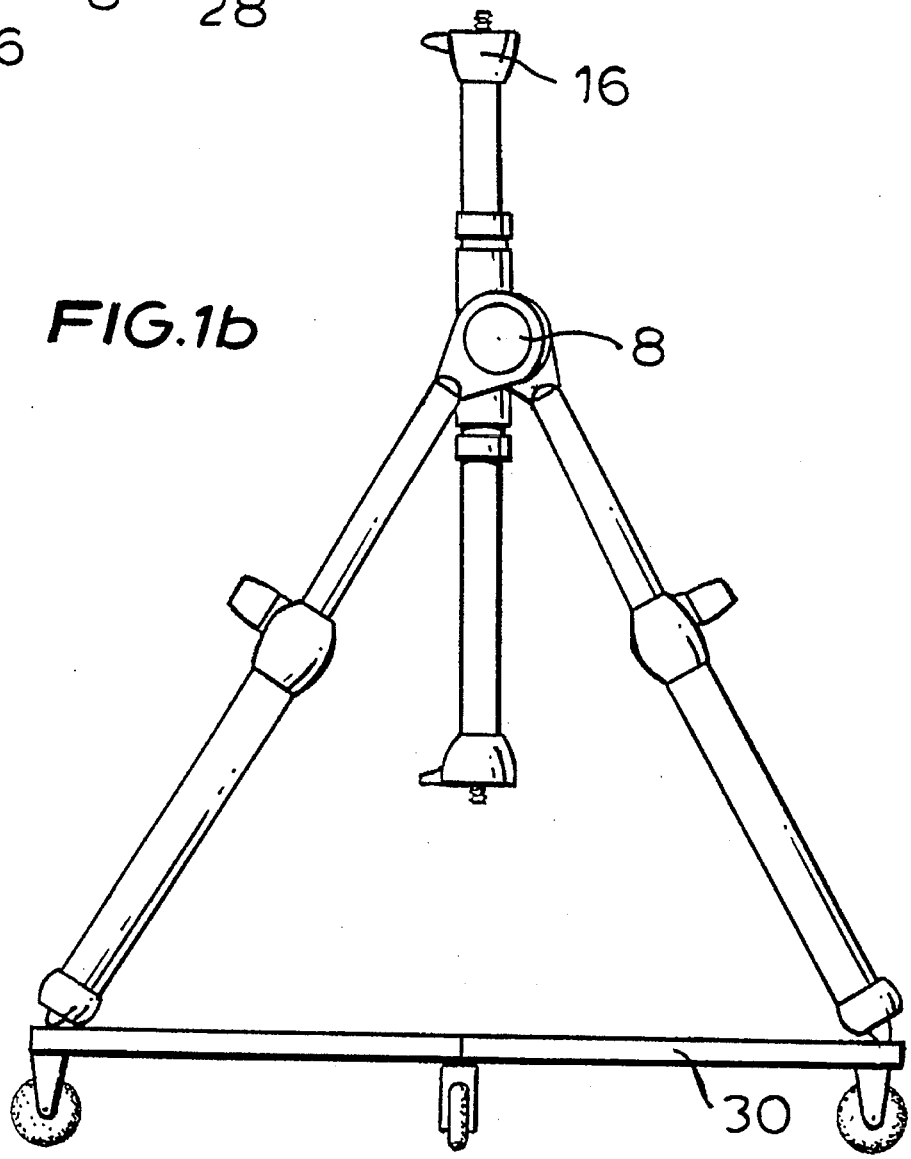
FIG. 1b shows the tripod in an erected condition.
Figure 1C:
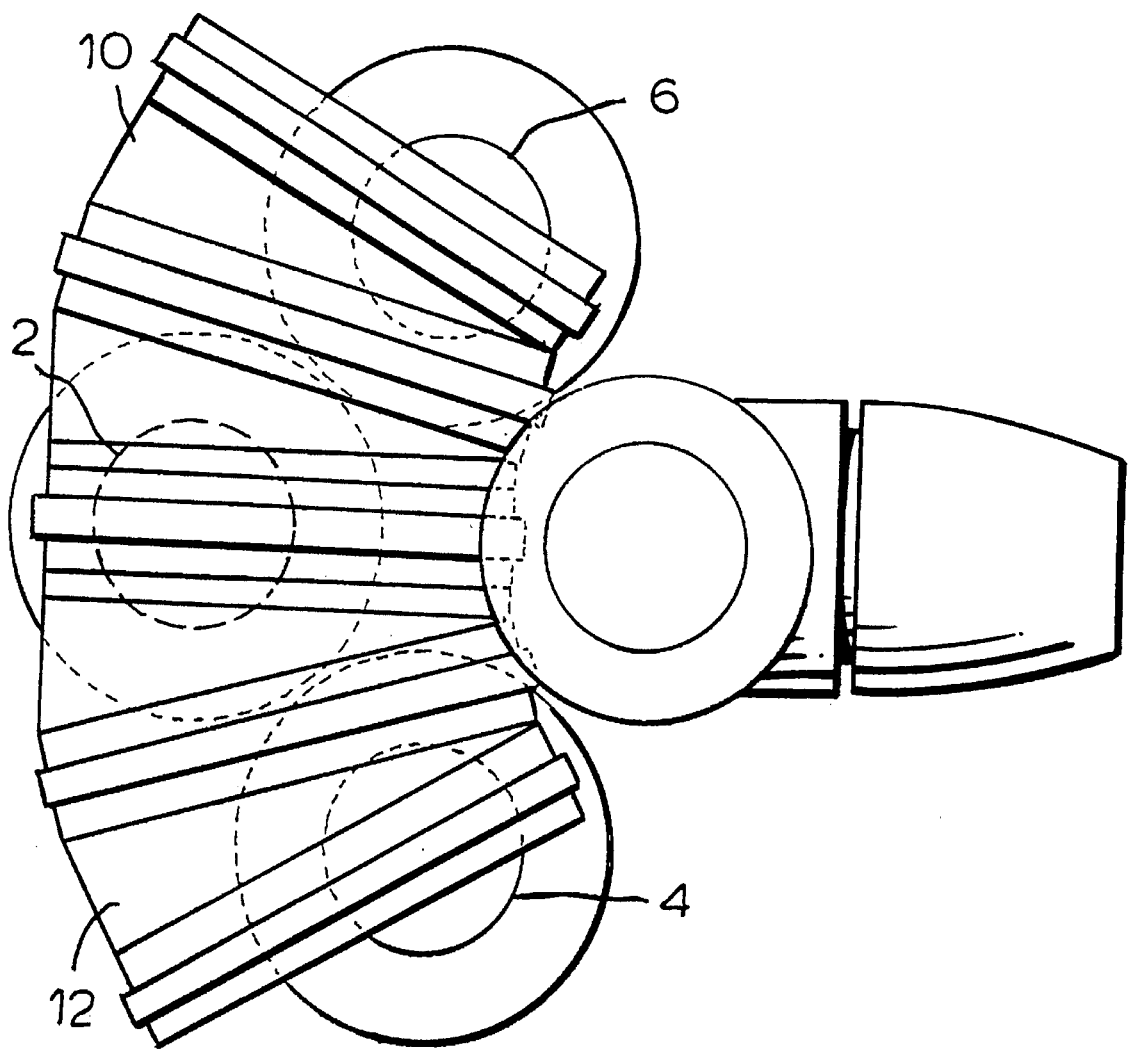
FIG. 1c is a diagrammatic top plan view of the tripod head.

Referring to FIG. 1a, the tripod comprises three telescopic legs 2, 4, and 6, the latter, of course, being hidden behind leg 4 in the figure, which are connected at their upper ends 8 by a known type of "wedge" assembly, 10, 12 illustrated in FIG. 1c, which is held together by an arcuate bolt (not shown). A sliding pillar 14, having a camera support platform 16 at each end, is mounted in a pillar guide 18, also pivoted to the head, as described in more detail below.

Figures 1D, 1E:
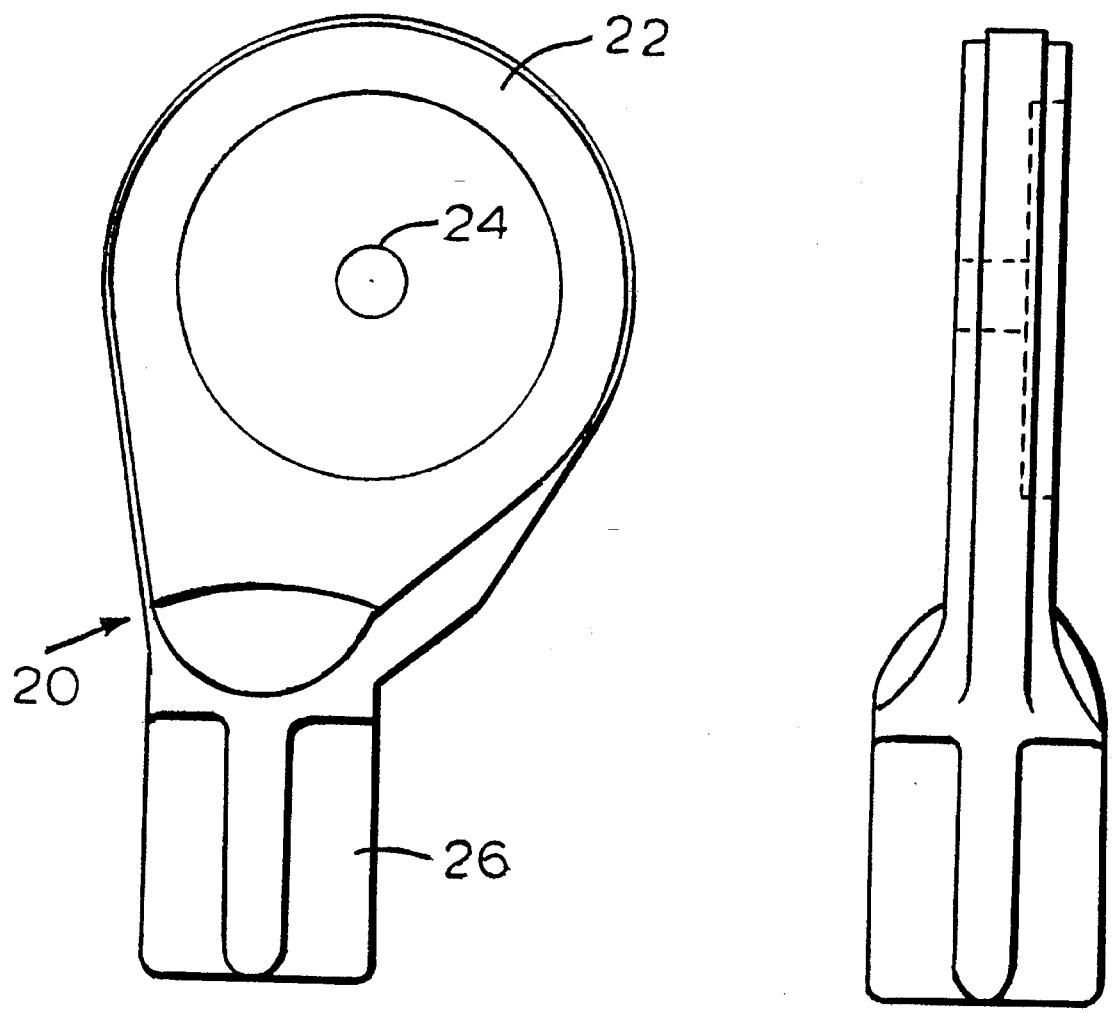
FIG. 1d is a side elevation of a tripod leghead.
FIG. 1e is a side elevation taken at right angles to the view of FIG. 1d.

As will be seen from the drawings, and particularly FIG. 1d, the "leghead" of each leg comprises a casting including a disc-like member having an axial hole 24 for the arcuate bolt, and a shank 26 adapted to fit into the end of a hollow leg, and whose axis is offset relative to the pivot axis. As shown in FIG. 1a the offset is sufficient to allow the legs 2, 4, 6 to be brought into parallel alignment in the folded condition even though each leg includes a clamp device 28 which would otherwise come into contact with the corresponding clamp device of the other legs.

It will also be appreciated from FIG. 1b that the leg offset allows the tripod to be more easily and uniformly mounted on a studio "dolly" 30.

Referring to FIG. 2, the pillar guide comprises a pair of half shells (50), which, when fixed together, provide a guide tube having an axis (52), in which the central pillar of the tripod is mounted. As shown, each half shell has a pair of locating pins (54) and a pair of complementary register holes (56), which are so arranged on its mating surface, that when two half shells are brought into engagement they will be properly registered together.

Each half shell also incorporates a downwardly dependent bracket (58), incorporating a bolt hole (60), through which the arcuate bolt of the tripod head passes, so that the pillar guide is held in position in use.

The outer ends of the guide tube are formed with an external thread, as indicated at (62), to enable them to receive internally threaded collars which hold the whole assembly together. An internally threaded aperture (64) in the top of the pillar guide receives a hand operated bolt, which is tightened in order to hold the pillar in a desired position.

Figure 4:
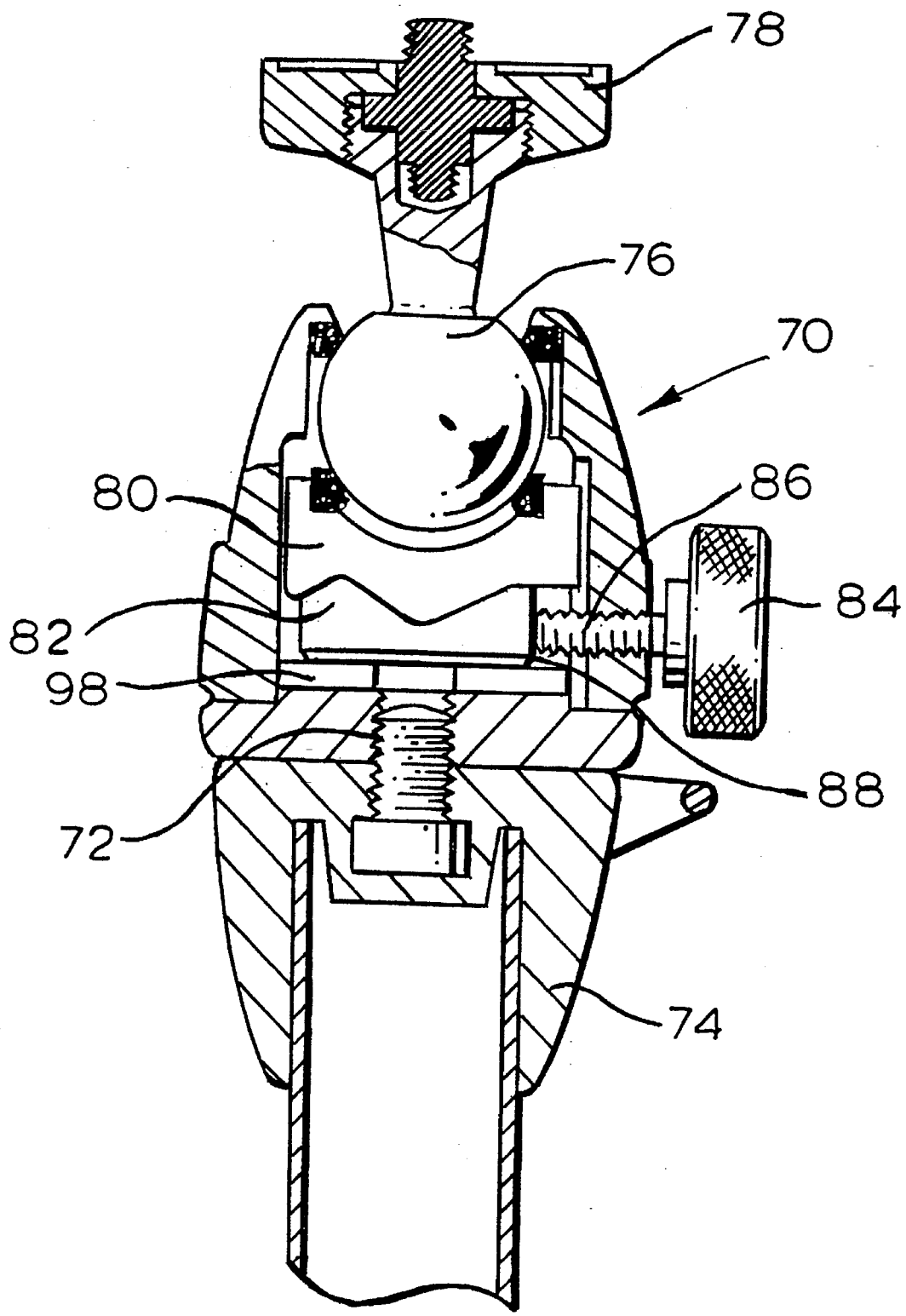
FIG. 4 is a cross-section view of a ball and socket head.

Referring to FIG. 4, the ball and socket head (70) comprises a housing which is circular in plan and incorporates an axially positioned tripod bush (72) in its base, so that it can be mounted on a tripod screw of a camera platform (74). A ball (76) is mounted in housing and carries a platform (78) on which a camera can be mounted, the ball being supported on a seat (80), which co-operates with a locking member (82) shown in more detail in FIGS. 5 and 6.

The locking member is actuated by means of a knob (84) at the side of the ball and socket head, having a thread shaft (86) which engages with a flat surface (88) on the side of the locking member. The ball seat (80) and the locking member (82) have complementary double camming surfaces (85, 87), formed on the lower surface of the seat and the upper surface of the locking member, respectively. As can be seen from the drawings, these camming surfaces are so arranged that, when the locking member is moved in the axial direction of the threaded shaft (86) by rotating the control knob (84), the co-operation of the sloped camming surfaces will cause the seat (80) to be shifted upwards to lock the ball (76) in position.

It will be also be seen from a comparison of FIGS. 5 and 6, that the ball seat (80) is provided with a diametrically extending slot (90) which accommodates a corresponding key (92) extending across the top of the locking member (82), so as to maintain them in the same rotational orientation. In order to prevent the ball seat from rotating in the housing (70), it is also provided with an axially extending key (94) on its outer surface, which co-operates with a keyway (96) on the inner surface of the housing.

Figure 6D:
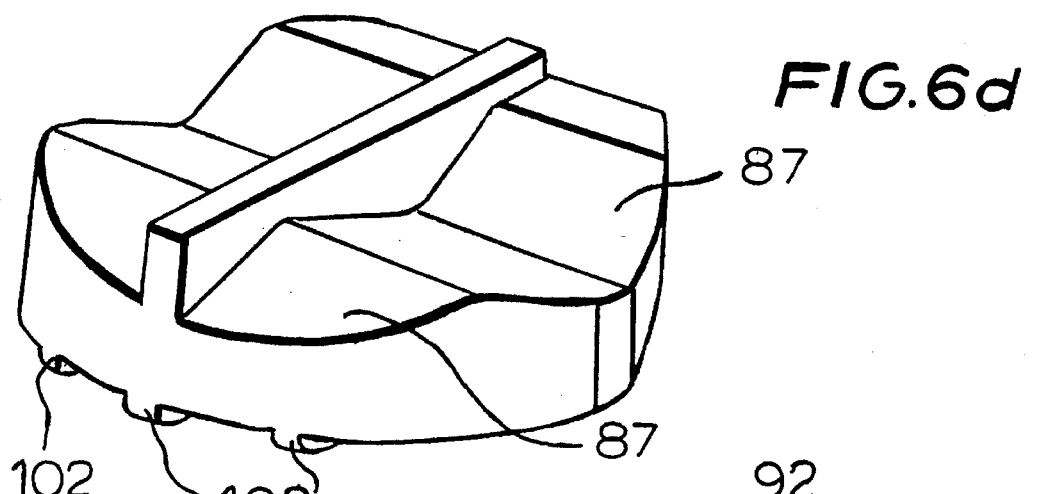
Figure 6E:
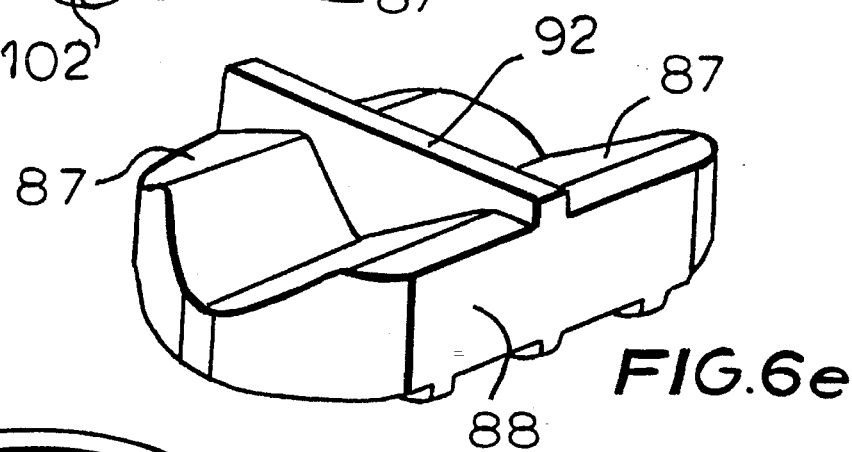
FIG. 6e is a perspective view from the other side.
Figure 6F:
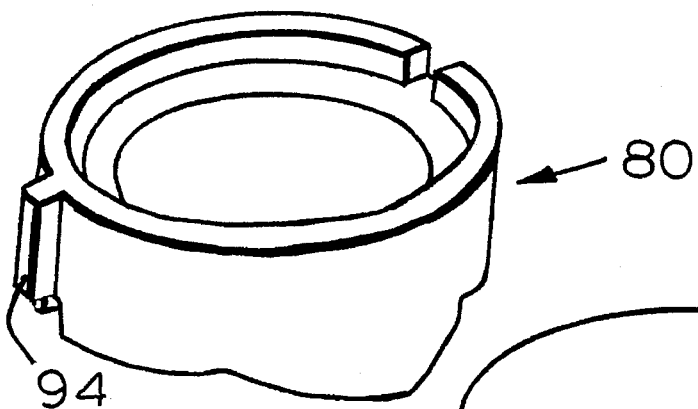
FIG. 6f is a perspective view from above, of the ball set.
Figure 6G:
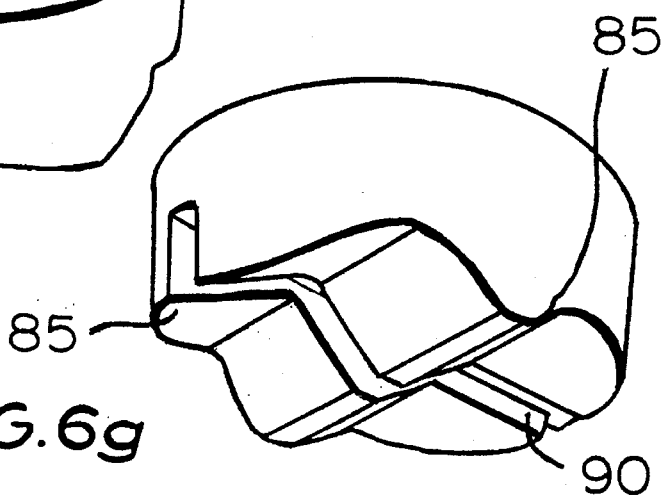
FIG. 6g is an underneath perspective view of the ball seat of FIG. 6f.

In addition, a flat steel washer or seating member (98) is interposed between the locking member (82) and the base of the ball and socket head, and the base of the locking member is cut away as indicated at (100) in FIG. 6c, so as to leave three narrow "runners" (102) on its base, and thus miniraise the friction between the locking member and the washer (98).

Figure 7A:
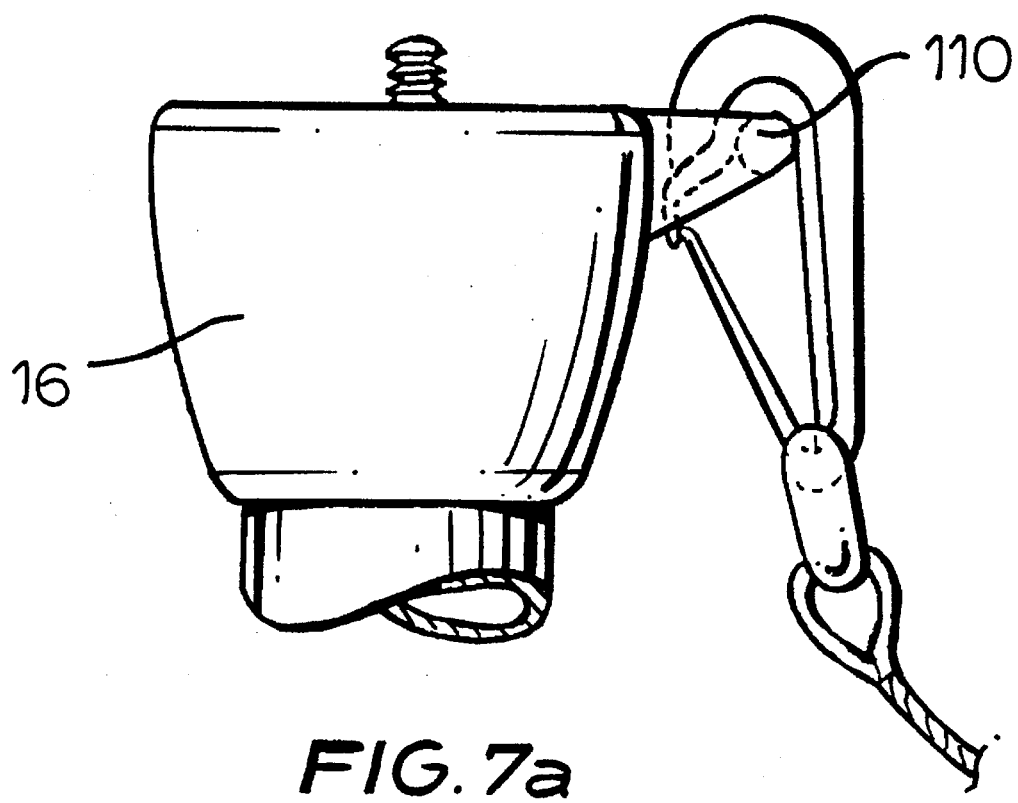
FIG. 7a is a side elevation of a camera platform on the end of the tripod pillar.
Figure 7B:
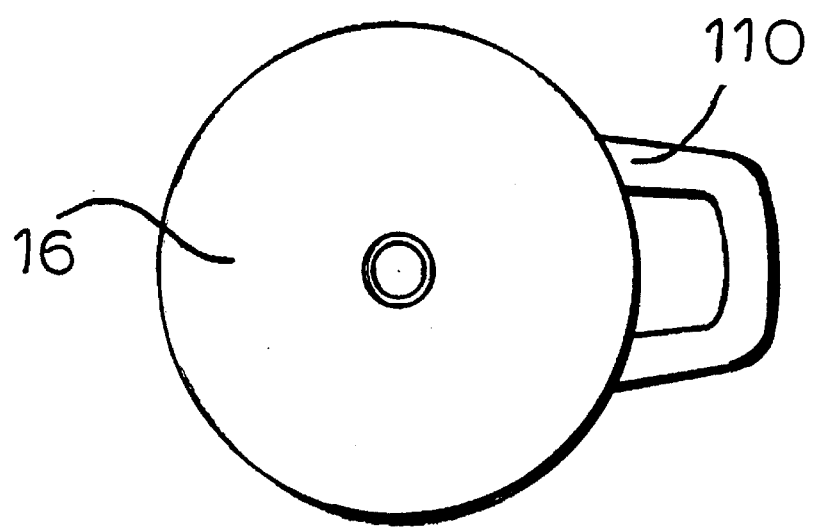

Referring to FIG. 7, each camera platform is formed with a projection 110 having an aperture 112, projecting from one side, so that a carrying strap 114 with suitable clips on its ends, can be attached to the projections (see FIG. 1a). This is particularly useful when a heavy camera 116 is mounted on the tripod since the pillar can be slid to a suitable position in the pillar guide, to balance whole assembly and thus make it easier to carry.

I claim:

1. A tripod comprising:

a plurality of supporting legs;

a mounting head to which the legs are pivotably connected;

a support pillar slidably mounted in the mounting head;

mounting means for a camera or the like, located on at least one end of said pillar; and carrying strap attachment means at each end of said pillar whereby the relative positions of the article, and the legs of the tripod, can be adjusted by sliding the head along the pillar when the assembly is being carried by the strap in order to balance the weight of the assembly.

2. A tripod according to claim 1 in which the pillar includes an article mounting platform at each end, each platform incorporating a ring for attachment of the strap.

3. A tripod of the type including a mounting head with an arcuate bolt on which the tripod legs are pivoted and also carrying an article-supporting mounting, and a plurality of wedge-shaped spacers arranged to space apart the tripod pivots at appropriate angles, further comprising a pivotable bracket mounted on the arcuate bolt and carrying a tubular pillar guide for a slidable article-supporting pillar, in which the pillar guide is formed from two axially symmetrical half-shells and terminates in a tubular extension at each end which is threaded on its outer surface so as to receive a threaded collar, whereby the two end collars hold the half shells together.

4. A tripod comprising:

a mounting head with an arcuate bolt;

tripod legs which are pivoted on said arcuate bolt, wherein said tripod legs each comprise at least two telescoping sections and a clamp device for selectively locking said at least two telescoping sections in relation to each other;

an article-supporting mounting carried by said mounting head; and, a plurality of wedge-shaped spacers arranged to space apart the tripod pivots at appropriate angles, wherein a pivot point of each leg is offset, relative to a leg axis, in order to space said tripod leg clamp devices from each other and facilitate the folding of the legs into parallel alignment when the tripod is folded.

5. A ball and socket head for a tripod comprising a ball carrying a camera mounting platform, and a retaining housing for the ball, having an aperture through which the camera platform projects, and a seat for the ball which is supported by means of a wedging device which is slidable laterally, relative to the axis of the head, and cooperates with a complementary sloping surface on the underside of the ball seat, means being provided for moving the wedging device, and consequently the seat, by a small distance in the said lateral direction, so as to grip or release the ball wherein said wedging device comprises two diametrically offset, parallel sloping formations, and the ball seat is provided with complementary formations.

* * * * *